Sept. 23, 1924.
T. MIDGLEY
1,509,366
METHOD OF FORMING TIRE CASINGS
Filed July 10, 1920
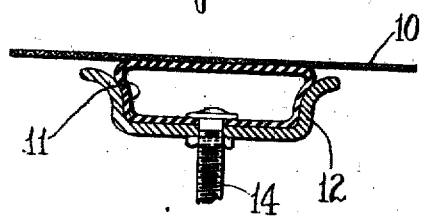
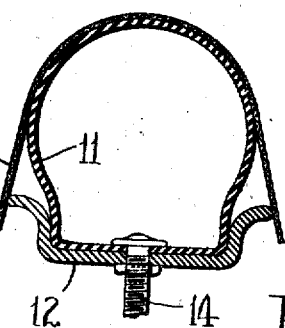
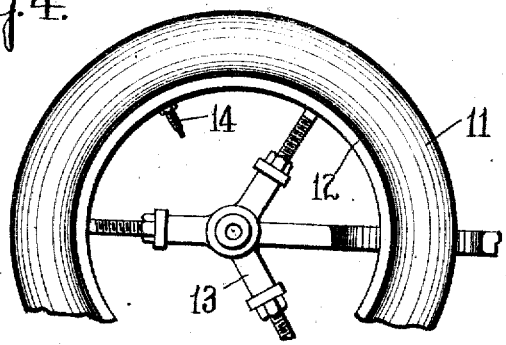
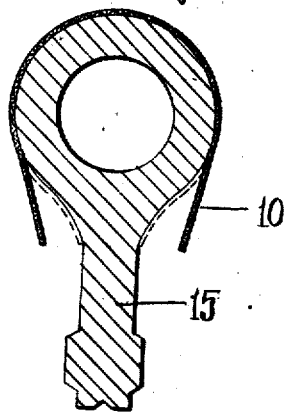
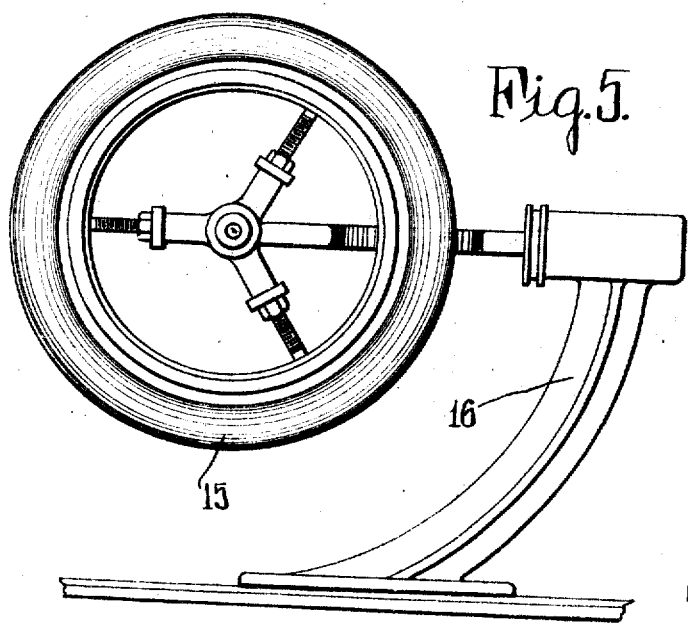
INVENTOR
Thomas Midgley.
BY
Edward C. Taylor
ATTORNEY Patented Sept. 23, 1924.

1,509,366

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF FORMING TIRE CASINGS.

Application filed July 10, 1920. Serial No. 395,323.

*To all whom it may concern:*

Be it known that I, THOMAS MIDGLEY, a citizen of the United States of America, residing at Hampden, in the county of Hampden and State of Massachusetts, have invented certain new and useful Improvements in a Method of Forming Tire Casings, of which the following is a specification.

My invention relates to methods of building tire casings, and has for its object the improvement of the tire casing itself and the facilitation of its manufacture in various ways which will more fully appear from the description and claims.

My invention will be described with particular reference to the accompanying drawings, in which Fig. 1 is a section showing the band of fabric prior to the stretching operation;

Fig. 2 is a similar view at the completion of the stretching;

Fig. 3 is a section showing the band positioned on a core;

Fig. 4 is a side elevation of the stretching apparatus; and

Fig. 5 is a side elevation of the core on which the fabric is mounted for the final shaping.

By my invention, among other advantages, I am enabled to position the fabric on the core with the strain-resisting elements lying more accurately in their proper positions for taking the strain which is imposed upon them in the use of the tire. I also greatly reduce the unevenness of stretch, both lateral and longitudinal, which is inherent in existing processes. My invention also renders the operation of placing the fabric on the core one requiring much less skill and strength than the usual methods.

Those skilled in this art recognize that the usual methods of building tire carcasses on formers or cores do not result in laminating the fabric or cord under the balanced conditions of stretch and tension desired in the resulting structure when in road use. To overcome the objections many methods have been suggested which omit all use of the rigid former or core. Nevertheless the great convenience in using a former or core during the building and handling operations of the tire in the factory has been the cause of the continued and wide use of the old and usual methods with the cores as a basis for the building operations. By the practice of my invention successive laminations of the tire structure or successive portions of the structure in the form of endless bands are given a balanced condition of stretch and tension and are then laminated on the former or core for their final association and desired relation in the tire. The core and the structure thus built upon it gives the desired convenience for factory operations and the tire so built is a better tire than tires built according to prior processes.

My invention is preferably practiced as follows:

A band of tire building material 10, preferably of bias cut rubberized fabric or cord composed of one or more plies, and designed to form only a portion of the casing, is located around an expansible member such as an air tube 11 supported on a rim 12, mounted as on a buck 13. Preferably, in case so-called cord fabric is used, the material is formed in bands comprising two single plies. The single-ply band illustrated in the drawings is, however, suitable for use where square-woven fabric is employed. A valve 14 serves for the introduction of compressed air to the tube. The band so located is stretched and shaped by expanding the air tube into substantially the form shown in Fig. 2 in which the maximum circumference of the band is substantially that of the core or former, or of a previously partially built carcass. This expansion of the air tube against the band gives the latter both a circumferential and a longitudinal stretch and locates the strain-resisting elements in the proper positions to best bear the strains to be placed upon them in vulcanization and use.

After the band has been so stretched the air tube is deflated and the band removed and placed upon a core or former 15, which may be supported on a buck 16. The previous stretching shapes the band so that it substantially conforms to the core or former, or to the previously laid plies on the core, and can readily be slipped over the crest of the core without any material further stretching. The band so located will be substantially the position shown by the full lines in Fig. 3. The stretched rubber of the band will contract, tending to draw the band closely against the core or former and what little additional shaping is necessary to get the band into the dotted line position of Fig. 3 can be accomplished by pressing the edges of the band towards the core without any injurious lateral stretching of the fabric such as was necessary in previous methods. The operation of applying successive plies in this manner is continued until a carcass of the desired thickness is built up on the former or core, the bead material being added between the plies in any usual or desired way.

By the method described or its equivalent the fabric or cord of the tire carcass is shaped and stretched at the same time and under better balanced tension conditions than in prior methods. The carcass is built up with portions of its structure successively shaped and stretched according to the shape and even tension conditions desired for the vulcanizing operation and for use. The carcass so built may then have its tread and side walls applied in the usual ways or by stretching and shaping a rubber band in substantially the same manner as the fabric bands. My improved process presents many advantages in the application of the outer portions of the casing, such as the breaker and cushion strips, the tread, the side walls, and the chafing strip which surrounds the bead; one of these advantages residing in the fact that these elements can be applied as a unitary band, without stretching the side walls and the chafing strip unduly. The tension given to the rubber tread band, however, is not of equal importance to that given to the fabric plies. The uncured tire casing thus obtained is in better condition to undergo the various vulcanizing methods under pressure than tire casings built in other ways. The vulcanization may be performed in any usual or desired way.

I claim:

1. The method of building tire casings on cores or formers comprising forming a plurality of layers of fabric as endless bands, expanding the bands with the central portions stretched more than the sides, and successively applying the bands so treated to the core or former.

2. The method of building tire carcasses on a ring core or former consisting in superposing upon the core or former successive endless bands of tire-building material, each band being shaped to substantially its final form before being located on the core or former.

3. The method of building tire carcasses on a rigid ring core or former, consisting in forming a plurality of layers of tire building material as endless bands, stretching each band laterally and circumferentially to substantially the curvature of the core or former, and superposing upon the rigid core or former the bands so stretched.

4. The method of applying fabric to cores or formers comprising forming the fabric into a bias cut band, locating the band about an expansible tube, expanding the center of the band to substantially the diameter of the core or former at its crest leaving the side portions of the band relatively less stretched, removing the band from the tube, and applying the band to the core or former.

5. The method of applying fabric to cores or formers in the building of tire casings comprising forming the fabric into a band of substantially the bead diameter of the core or former, stretching the central portion of the band to substantially the crest diameter of the core or former, and applying the stretched fabric to the core or former.

6. The method of making a tire casing comprising forming an endless band of extensible rubberized fabric, mounting the band upon an annular air tube, expanding the air tube until the central portion of the band is substantially the circumference of the core or former upon which the carcass is to be built, removing the band from the air tube, positioning the stretched band upon the core or former, pressing the side portions of the band against the core or former, stretching and positioning further bands in a similar manner until a carcass of the desired thickness is obtained, adding bead reinforcements and an external rubber covering, and vulcanizing the casing thus formed.

7. The method of building tire casings comprising forming a carcass structure, forming the tread and side-walls as a unitary endless band, pre-shaping said band to substantially the outer configuration of the carcass, and applying the pre-shaped band to the carcass.

8. The method of building tire casings comprising forming a carcass structure, separately forming the tread, side-walls, breaker, and chafing-strip as an endless band of substantially the bead diameter of the carcass, pre-shaping the band to substantially the outer configuration of the carcass, and applying the so-shaped band to the carcass.

THOMAS MIDGLEY.